(12) United States Patent
Green

(10) Patent No.: US 9,528,447 B2
(45) Date of Patent: Dec. 27, 2016

(54) FUEL MIXTURE CONTROL SYSTEM

(76) Inventor: Jason Eric Green, Davie, FL (US)

(*) Notice: Subject to any disclaimer, the term of this patent is extended or adjusted under 35 U.S.C. 154(b) by 1000 days.

(21) Appl. No.: 12/881,324

(22) Filed: Sep. 14, 2010

(65) Prior Publication Data

US 2012/0060800 A1    Mar. 15, 2012

(51) Int. Cl.
| | | |
|---|---|---|
| F02B 13/00 | (2006.01) | |
| F02M 21/02 | (2006.01) | |
| F02D 19/06 | (2006.01) | |
| F02D 9/02 | (2006.01) | |
| F02D 11/10 | (2006.01) | |
| F02D 19/08 | (2006.01) | |
| F02D 29/02 | (2006.01) | |
| F02D 41/00 | (2006.01) | |
| F02D 41/02 | (2006.01) | |

(Continued)

(52) U.S. Cl.
CPC ............ *F02D 19/0647* (2013.01); *F02D 9/02* (2013.01); *F02D 11/105* (2013.01); *F02D 19/0628* (2013.01); *F02D 19/081* (2013.01); *F02D 29/02* (2013.01); *F02D 41/0025* (2013.01); *F02D 41/021* (2013.01); *F02D 11/106* (2013.01); *F02D 17/04* (2013.01); *F02D 19/0618* (2013.01); *F02D 41/2422* (2013.01); *F02D 41/266* (2013.01); *Y02T 10/36* (2013.01)

(58) Field of Classification Search
CPC ............ F02M 13/08; F02D 19/10; F02B 3/06
USPC ... 123/510, 361, 27 GE, 525–529, 575–578, 123/3; 701/104
See application file for complete search history.

(56) References Cited

U.S. PATENT DOCUMENTS

| | | |
|---|---|---|
| 3,866,781 A | 2/1975 | Stedman et al. |
| 3,872,473 A | 3/1975 | Melgaard et al. |

(Continued)

FOREIGN PATENT DOCUMENTS

| | | |
|---|---|---|
| CA | 2741263 | 10/2014 |
| WO | WO 02/101214 | 12/2002 |

(Continued)

OTHER PUBLICATIONS

GFS Corp., 'First LNG Mining Truck in U.S.' [online press release]. Oct. 21, 2010. Retrieved from the Internet on Oct. 25, 2012: http://www.d2ginc.com/PDF/First%20LNG%20Mining%20Truck%20In%20US%20Press%20Kit%20Ocl%2021.pdf.
Caterpillar 785C Mining Truck Spec Sheet, 2010.

*Primary Examiner* — Lindsay Low
*Assistant Examiner* — George Jin
(74) *Attorney, Agent, or Firm* — Malloy & Malloy, P.L.

(57) ABSTRACT

A control system operative to establish a coordinated composition of gaseous fuel and distillate fuel specifically adaptable for use in high capacity, off-road, mine haul vehicles and including an electronic control unit structured to modulate a throttle position signal from the vehicle throttle assembly and transmit the modulated throttle position signal to a vehicle engine control assembly. The electronic control unit concurrently generates an auxiliary fuel control signal to a gaseous control unit, dependent at least in part, on the operating modes and operating characteristics of the vehicle. The auxiliary control signal is determinative of a quantity of gaseous fuel to be included in an operative fuel mixture, wherein said modulated throttle position signal and said auxiliary control signal are determinative of the operative fuel mixture on which the vehicle engine operates during predetermined ones of the operating modes of the vehicle engine.

19 Claims, 3 Drawing Sheets

(51) Int. Cl.
F02D 17/04 (2006.01)
F02D 41/24 (2006.01)
F02D 41/26 (2006.01)

(56) References Cited

U.S. PATENT DOCUMENTS

| | | | |
|---|---|---|---|
| 4,006,852 A | 2/1977 | Pilsner et al. | |
| 4,078,629 A | 3/1978 | Kutay et al. | |
| 4,234,922 A | 11/1980 | Wilde et al. | |
| 4,288,086 A | 9/1981 | Oban et al. | |
| 4,335,697 A | 6/1982 | McLean | |
| 4,415,051 A | 11/1983 | Taylor | |
| 4,442,665 A | 4/1984 | Fick et al. | |
| 4,489,699 A | 12/1984 | Poehlman | |
| 4,499,885 A | 2/1985 | Weissenbach | |
| 4,522,159 A | 6/1985 | Engel et al. | |
| 4,527,516 A * | 7/1985 | Foster | 123/27 GE |
| 4,535,728 A | 8/1985 | Batchelor | |
| 4,597,364 A | 7/1986 | Young | |
| 4,603,674 A | 8/1986 | Tanaka | |
| 4,606,322 A | 8/1986 | Reid et al. | |
| 4,617,904 A | 10/1986 | Pagdin | |
| 4,641,625 A * | 2/1987 | Smith | 123/575 |
| 4,708,094 A | 11/1987 | Helmich et al. | |
| 4,770,428 A | 9/1988 | Sugiyama | |
| 4,799,565 A | 1/1989 | Handa et al. | |
| 4,817,568 A | 4/1989 | Bedford | |
| 4,861,096 A | 8/1989 | Hastings | |
| 4,955,326 A | 9/1990 | Helmich | |
| 5,033,567 A | 7/1991 | Washburn et al. | |
| 5,050,550 A | 9/1991 | Gao | |
| 5,054,799 A | 10/1991 | Fingerle | |
| 5,081,969 A | 1/1992 | Long, III | |
| 5,092,305 A | 3/1992 | King | |
| 5,156,230 A | 10/1992 | Washburn | |
| 5,215,157 A | 6/1993 | Teich | |
| 5,224,457 A * | 7/1993 | Arsenault et al. | 123/526 |
| 5,355,854 A | 10/1994 | Aubee | |
| 5,370,097 A * | 12/1994 | Davis | F02D 19/0631 123/27 GE |
| 5,375,582 A | 12/1994 | Wimer | |
| 5,379,740 A | 1/1995 | Moore et al. | |
| 5,404,711 A | 4/1995 | Rajput | |
| 5,518,272 A | 5/1996 | Fukagawa | |
| 5,526,786 A * | 6/1996 | Beck et al. | 123/357 |
| 5,546,908 A | 8/1996 | Stokes | |
| 5,566,653 A | 10/1996 | Feuling | |
| 5,566,712 A | 10/1996 | White et al. | |
| 5,593,167 A | 1/1997 | Barnhardt et al. | |
| 5,598,825 A * | 2/1997 | Neumann | 123/478 |
| 5,609,037 A | 3/1997 | Fischler | |
| D384,341 S | 9/1997 | Hoffman et al. | |
| 5,701,928 A | 12/1997 | Aoki | |
| 5,735,253 A * | 4/1998 | Perotto et al. | 123/406.47 |
| 5,755,210 A | 5/1998 | Sato et al. | |
| 5,794,979 A | 8/1998 | Kasuga et al. | |
| 5,806,490 A | 9/1998 | Nogi et al. | |
| 5,810,309 A | 9/1998 | Augustine et al. | |
| 5,845,940 A | 12/1998 | Colburn | |
| 5,937,800 A | 8/1999 | Brown et al. | |
| 5,996,207 A | 12/1999 | Brown | |
| 6,003,478 A * | 12/1999 | Huber | 123/27 GE |
| 6,041,762 A | 3/2000 | Sirosh et al. | |
| 6,101,986 A | 8/2000 | Brown et al. | |
| 6,151,547 A | 11/2000 | Kumar et al. | |
| 6,168,229 B1 | 1/2001 | Kooi et al. | |
| 6,250,260 B1 * | 6/2001 | Green | 123/27 GE |
| 6,250,723 B1 | 6/2001 | Barberis et al. | |
| 6,289,881 B1 | 9/2001 | Klopp | |
| D452,693 S | 1/2002 | Mitchell | |
| 6,513,485 B2 | 2/2003 | Ogawa et al. | |
| 6,543,395 B2 * | 4/2003 | Green | 123/27 GE |
| 6,550,811 B1 | 4/2003 | Bennett et al. | |
| 6,676,163 B2 | 1/2004 | Joitescu et al. | |
| 6,718,952 B2 | 4/2004 | Finch | |
| 6,751,835 B2 | 6/2004 | Fenton | |
| 6,766,231 B2 | 7/2004 | Nakagawa et al. | |
| D496,940 S | 10/2004 | Fetterman | |
| 6,863,034 B2 * | 3/2005 | Kern et al. | 123/3 |
| 6,875,258 B2 | 4/2005 | Kuperus | |
| 6,938,928 B2 | 9/2005 | Pfohl et al. | |
| 7,019,626 B1 * | 3/2006 | Funk | 340/438 |
| D525,550 S | 7/2006 | Egidio | |
| D549,721 S | 8/2007 | Ito et al. | |
| 7,270,209 B2 | 9/2007 | Suess | |
| D552,121 S | 10/2007 | Carl et al. | |
| D555,164 S | 11/2007 | Sergio | |
| 7,299,122 B2 | 11/2007 | Perkins | |
| 7,334,818 B2 | 2/2008 | Mascarenhas et al. | |
| 7,341,164 B2 | 3/2008 | Barquist | |
| 7,410,152 B2 | 8/2008 | Yates | |
| 7,441,189 B2 | 10/2008 | Michaels | |
| 7,444,986 B2 | 11/2008 | Shute | |
| 7,607,630 B2 | 10/2009 | Jung et al. | |
| 7,775,311 B1 | 8/2010 | Hardy et al. | |
| 7,874,451 B2 | 1/2011 | Bell | |
| 7,976,067 B2 | 7/2011 | Naganuma et al. | |
| 7,979,522 B2 | 7/2011 | Lunsford | |
| 8,005,603 B2 | 8/2011 | Fisher et al. | |
| 8,125,346 B2 | 2/2012 | Ballard et al. | |
| 8,282,132 B2 | 10/2012 | Griesbaum | |
| D681,670 S | 5/2013 | Fletcher et al. | |
| D686,244 S | 7/2013 | Moriya et al. | |
| 8,498,799 B2 * | 7/2013 | Matthews et al. | 701/104 |
| 8,534,403 B2 | 9/2013 | Pursifull | |
| 8,550,274 B2 | 10/2013 | Gerding | |
| 8,556,107 B2 | 10/2013 | McRobbie et al. | |
| 8,820,289 B2 | 9/2014 | Green | |
| 8,881,933 B2 | 11/2014 | Green | |
| 8,882,071 B2 | 11/2014 | Green | |
| 9,031,763 B2 | 5/2015 | Green | |
| D733,176 S | 6/2015 | Lin | |
| 2001/0037549 A1 | 11/2001 | Fenton | |
| 2002/0017088 A1 | 2/2002 | Dillon | |
| 2002/0029770 A1 * | 3/2002 | Heffel et al. | 123/527 |
| 2002/0030397 A1 | 3/2002 | Tamura et al. | |
| 2002/0078918 A1 * | 6/2002 | Ancimer et al. | 123/295 |
| 2003/0178422 A1 | 9/2003 | Kosuge et al. | |
| 2003/0187565 A1 | 10/2003 | Wong | |
| 2004/0011050 A1 | 1/2004 | Inoue | |
| 2004/0140412 A1 | 7/2004 | Hendzel et al. | |
| 2004/0148086 A1 * | 7/2004 | Tafazoli et al. | 701/103 |
| 2005/0121005 A1 * | 6/2005 | Edwards | F02D 19/0631 123/525 |
| 2005/0230579 A1 | 10/2005 | Mascarenhas et al. | |
| 2006/0032532 A1 | 2/2006 | Suess et al. | |
| 2006/0033322 A1 | 2/2006 | Suess | |
| 2006/0161315 A1 | 7/2006 | Lewis | |
| 2007/0277530 A1 | 12/2007 | Dinu et al. | |
| 2008/0023957 A1 | 1/2008 | Diehl | |
| 2008/0042028 A1 | 2/2008 | Ross et al. | |
| 2008/0163627 A1 | 7/2008 | ELKady et al. | |
| 2009/0000842 A1 | 1/2009 | Hwang et al. | |
| 2009/0152043 A1 | 6/2009 | Lee | |
| 2009/0320786 A1 * | 12/2009 | Fisher | F02D 19/0647 123/27 GE |
| 2010/0045017 A1 | 2/2010 | Rea | |
| 2010/0051567 A1 | 3/2010 | Ross, Jr. | |
| 2010/0078244 A1 | 4/2010 | Pursifull | |
| 2010/0127002 A1 | 5/2010 | Bel | |
| 2010/0263382 A1 | 10/2010 | Mancini et al. | |
| 2011/0087988 A1 | 4/2011 | Ray et al. | |
| 2011/0202256 A1 | 8/2011 | Sauve et al. | |
| 2011/0209074 A1 | 8/2011 | Gill et al. | |
| 2012/0001743 A1 | 1/2012 | Cotten et al. | |
| 2012/0060800 A1 | 3/2012 | Green | |
| 2012/0067660 A1 | 3/2012 | Kashu et al. | |
| 2012/0112533 A1 | 5/2012 | Yarmak et al. | |
| 2012/0253641 A1 | 10/2012 | Warner et al. | |
| 2012/0296552 A1 | 11/2012 | Matthews, Jr. et al. | |
| 2012/0310509 A1 | 12/2012 | Pardo et al. | |
| 2012/0325355 A1 | 12/2012 | Docheff | |
| 2013/0068905 A1 | 3/2013 | Green | |
| 2013/0069357 A1 | 3/2013 | Green | |

(56) References Cited

U.S. PATENT DOCUMENTS

2013/0074816 A1  3/2013  Green
2013/0092694 A1  4/2013  Green
2013/0112768 A1  5/2013  Hagenbuch
2013/0245864 A1  9/2013  Frazier et al.
2013/0284747 A1  10/2013  Rund
2013/0284748 A1  10/2013  Sloan et al.
2014/0053800 A1  2/2014  Steffen et al.
2014/0053816 A1  2/2014  Czapka et al.
2014/0060946 A1  3/2014  Willi
2014/0196687 A1  7/2014  Coldren et al.
2015/0000643 A1  1/2015  Green
2015/0020770 A1  1/2015  Green
2015/0025774 A1  1/2015  Green
2015/0142491 A1  5/2015  Webb
2016/0257196 A1  9/2016  Green

FOREIGN PATENT DOCUMENTS

| WO | WO 02101214 | 12/2002 |
| WO | WO 2008/037175 A1 | 4/2008 |
| WO | WO 2012/036768 | 3/2012 |
| WO | WO 2012/036768 A1 | 3/2012 |
| WO | WO 2013/039708 A1 | 3/2013 |
| WO | WO 2013/048812 A1 | 4/2013 |
| WO | WO 2013/058988 A2 | 4/2013 |
| WO | WO 2014/197594 | 12/2014 |
| WO | WO 2016/057239 | 4/2016 |
| WO | WO 2016/065026 | 4/2016 |
| WO | WO 2016/065109 | 4/2016 |

* cited by examiner

FUEL MIXTURE CONTROL SYSTEM

BACKGROUND OF THE INVENTION

Field of the Invention

This invention is directed to a control system which is operative to establish a variable operative fuel mixture for powering a vehicle, comprising both gaseous fuel, such as natural gas, and distillate fuels, such as diesel, dependent at least in part, on predetermined ones of a plurality of operating modes and operating characteristics of the vehicle. The fuel control system is specifically adaptable for determining an efficient and effective operative fuel mixture for powering high capacity off-road vehicles such as mine haul trucks.

Description of the Related Art

Mine haul trucks are off-highway, two axle, rigid dump trucks, specifically engineered for use in high production mining and heavy duty construction environments. As such, haul truck capacities typically range from 50 short tons (45 tons) to 400 short tons (363 tons). In addition, the largest and highest payload capacity of such haul trucks are referred to as "ultra class" trucks. This ultra class includes haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included secondary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

SUMMARY OF THE INVENTION

This invention is directed to a fuel control system specifically comprising technology that allows for the safe and efficient use of a gaseous fuel such as, but not limited to, natural gas, in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes; be either a predetermined combination of gaseous fuel and distillate fuel or substantially entirely distillate fuel, absent any contribution of gaseous fuel.

Moreover, the fuel control system of the present invention incorporates "real time" measurement capabilities specifically, but not exclusively, of each of the gaseous fuel and distillate fuel and the operative fuel mixture. More specifically, metering technology appropriate to each of the gaseous and distillate fuels will be used to establish data display and data logs of the percentage of gaseous fuel and diesel fuel of the operative fuel mixture composition. Such appropriate metering will also facilitate the tracking of the overall gaseous fuel and diesel fuel consumption. Also, the preferred measurement capabilities operative with the respective metering for each of the gaseous and distillate fuels will facilitate the optimization of both of the gaseous fuel throttle position and diesel fuel throttle position in a closed loop fashion.

More specifically, the fuel control system of the present invention is preferably designed to function as a master controller and a safety system, specifically adaptable for high capacity, off-road "mine haul" type vehicles. It is to be noted that the term "operative fuel mixture" may, as set forth above, include a composition composed of both gaseous fuel and distillate fuel. However, for purposes of clarity, the term "operative fuel mixture" may also specifically refer to a composition comprised substantially entirely of the distillate fuel. Accordingly and as set forth in greater detail hereinafter, the composition of the operative fuel mixture may best comprise both gaseous fuel and distillate fuel in predetermined quantities. However, when the vehicle engine is operating at different predetermined operating modes, maximum efficiency and/or safe operation of the vehicle may best be accomplished when the operative fuel mixture is substantially entirely composed of distillate fuel.

Also, the term gaseous fuel is meant to include natural gas or other gaseous type fuels appropriate for engine operation. Similarly, the term distillate fuels refers primarily to a diesel fuel in that the high capacity, off-road mine haul trucks and similar vehicles operate utilizing an electronic diesel engine comprising "fly-by-wire" type throttle control signals. As commonly recognized, the "fly-by-wire" systems incorporate an electronic interface wherein throttle positions and other operative features associated with the vehicle are converted to electronic signals transmitted to appropriate controls, processors, etc. which are determinative of vehicle engine operation.

Accordingly, the fuel control system of the present invention incorporates an electronic control unit (ECU) which is structured to modulate the throttle position signal (TPS) conventionally transmitted from the vehicle throttle foot pedal, or other throttle assembly, to the vehicle engine control assembly. Therefore, upon receipt of the throttle position signal, the ECU generates and transmits a "modulated throttle position signal" to the vehicle engine control assembly dependent at least in part on the operating mode(s) of the vehicle. The control system of the present invention further includes a gaseous control unit. The electronic control unit is further structured to generate an auxiliary fuel control signal which is transferred to the gaseous control unit dependent at least in part on the operating mode(s) of the vehicle.

The auxiliary control signal generated is transmitted concurrently to the modulated throttle position signal and both signals are determinative of a quantity of gaseous fuel and distillate fuel to be included in an operative fuel mixture on which the vehicle operates. Therefore, the modulated throttle position signal and the auxiliary control signal are collectively determinative of the composition of the operative fuel mixture on which the vehicle engine operates during at least a first predetermined number of the aforementioned operating modes of the vehicle engine.

As recognized in the operation of heavy duty, off-road mine haul vehicles, the operating modes of the vehicle include: low idle conditions when the vehicle is at rest; high idle conditions (dump mode) when the vehicle is at rest; the vehicle being unloaded on a zero grade support surface; loaded on a zero grade surface; unloaded in a climb orientation; loaded in a climb orientation; unloaded in a descent orientation and loaded in a descent orientation.

However, of the above noted operating modes of the mine haul vehicle, a "first predetermined number" of such operating modes are consistent with the composition of the operative fuel mixture including both the gaseous fuel and the distillate fuel in predetermined quantities. Such a first predetermined number of operating modes are herein recognized as including: unloaded condition of the vehicle in motion on a zero grade support surface; loaded condition of the vehicle in motion on a zero grade support surface; unloaded climb orientation of the vehicle in motion and loaded climb orientation of the vehicle in motion. Accordingly, maximum or increased efficiency of the vehicle engine when operating in the first predetermined number of operating modes can best be accomplished using an operative fuel mixture comprised of both gaseous fuel and distillate fuel.

However, a second predetermined number of operating modes of the vehicle engine include: a low idle, vehicle at rest; high idle (dump mode) vehicle at rest; unloaded descent orientation of the vehicle in motion and loaded descent orientation of the vehicle in motion. Accordingly, during operation of the vehicle in the second predetermined number of operating modes, the composition of the operative fuel mixture preferably comprises only the distillate fuel and is substantially void of any added gaseous fuel.

The fuel control system of the present invention and more specifically the electronic control unit further comprises programming capabilities which are operative to perform a throttle mapping function comprising the ability to determine pre-selected discrete throttle maps for at least some of said first predetermined number of operating modes. Moreover, each of the discrete throttle maps may be defined by the operative fuel mixture comprising a combined predetermined gaseous fuel and distillate fuel for vehicle engine operation, whereby the maximum possible amount of gaseous fuel is utilized for the particular engine payload scenario, in keeping with the normal combustion parameters, such as exhaust gas temperature (EGT), cylinder pressure and detonation limits. In addition, the throttle mapping capabilities include the ability to alter the programmed throttle maps based on both ambient temperature and manifold air temperature (MAT). It is recognized the gaseous fuel component of the operative fuel mixture can be present in higher percentages based on a lower temperature of the combustion air. By way of example only, the same mine haul truck operating in winter, or in an overall cooler operating environment, can have a greater amount of gaseous fuel contained in the operative fuel mixture than when operating during summer. Accordingly, the ambient temperature and the manifold air temperature at least partially control the quality of the operative fuel mixture at least to the extent of determining the amount of gaseous fuel capable of being included in the composition of the operative fuel mixture. The added safety advantages include the regulation or restriction of gaseous fuel to the operative fuel mixture when the mine haul truck is operating in varying environmental conditions as determined by pre-established temperature parameters.

In addition, the electronic control unit further comprises recognition capabilities operative with the programming capabilities and structured to recognize "operating characteristics" of the vehicle during at least some of the above noted operating modes. As used herein, the predetermined operating characteristics of the mine haul vehicle comprise: engine RPM; vehicle wheel speed; distillate throttle position signal; gaseous auxiliary control signal; engine coolant temperature sensing vehicle pitch and payload condition. Therefore, the recognition capability of the electronic control unit serves to recognize certain operating modes of the vehicle and concurrently recognize the operating characteristics of the vehicle while in the determined operating mode.

It is also to be noted that operation of the vehicle's engine using a gaseous fuel and distillate fuel operative mixture is also dependent on the engine having reached a minimum operating temperature. As such, the fuel control system includes engine coolant temperature sensing capabilities which are operative to prevent or restrict the inclusion of gaseous fuel in the operative fuel mixture until the engine has reached a predetermined minimum operating temperature. As indicated the operating temperature of the engine may be established by sensing the temperature of the engine coolant. Further, this feature prevents improper operation of either a liquid natural gas (LNG) vaporizer or a compressed natural gas (CNG) high pressure regulation system, both of which rely on the circulation of sufficiently hot engine coolant for their operation.

Additional features of the fuel control system of the present invention include monitoring capabilities structured to monitor a plurality of predetermined vehicle safety set points, each of which are determinative of safe operation of the vehicle. As a result, the monitoring capabilities include a control function interactive with the gaseous control unit to restrict gaseous fuel and thereby restrict the inclusion of the gaseous fuel in the operative fuel mixture when the monitoring capabilities indicate that the predetermined vehicle safety set points have been reached or exceeded. Elimination of the gaseous fuel from the operative fuel mixture will thereby restrict or regulate operation of the vehicle so as to bring it within the acceptable parameters of the predetermined vehicle safety set points. As a result, the control function associated with the monitoring capabilities is cooperatively structured with the gaseous control unit to substantially eliminate gaseous fuel content from the operative fuel mixture. In doing so, the control function is operative to effectively negate both modulation of the throttle position signal and generation of the auxiliary fuel control signal, dependent on recognition of at least predetermined or preset ones of the operating modes of the vehicle.

To further facilitate and assure safe operation of the vehicle, the electronic control unit further comprises programming capabilities which allows the pre-selection of the aforementioned plurality of predetermined vehicle safety set points. The user programmable safety set points may comprise: engine EGT; engine vibration; engine manifold air temperature (MAT); engine manifold air pressure; engine vacuum; lower explosive limits (LEL) in the engine bay; high gaseous fuel supply pressure (high pressure stage); high gaseous fuel supply pressure (low pressure stage); engine RPM; wheel speed and control; vehicle pitch limits and vehicle roll limits; flame detection capabilities for the chassis and engine bay as well as gas detection of the driver cab and engine bay. Moreover, the safety set points as at least partially outlined above can be "non-latching" or "latching" (i.e. locked out) depending on whether the monitored values exceed discrete "pre-alarm" or "alarm" set points respectively. Once a pre-alarm set point has been exceeded, the operative fuel mixture comprises 100% distillate fuel, which is maintained until the electronic control unit detects that the vehicle has come to an idle condition for a specified period of time, at which time the pre-alarm condition is reset automatically. In the case of an alarm set point being exceeded, the operative fuel mixture comprises 100% distillate fuel, which is maintained until the electronic control unit is reset by authorized personnel. Additional administrative features include the electronic control unit storing the pre-alarm and alarm information in non-volatile memory for subsequent retrieval and reporting. Additional data logging is accomplished for additional predetermined parameters to facilitate operator performed diagnostics.

Additional safety features are incorporated in the fuel control system of the present invention by providing an emergency stop or gas shut-off facility which may be manually activated by the operator or other personnel. This emergency stop or shut-off terminates gaseous fuel operation remotely, such as from the vehicle cab, as well as from a location exteriorly of the vehicle. Finally, an additional, user programmable set point is provided which allows for operation on 100% distillate fuel in the event the gaseous fuel supply level drops below a predetermined value.

In addition, yet another preferred embodiment of the present invention comprises a "user defined" gaseous fuel inhibiting feature. More specifically, the operator is provided and/or has access to a generic contact or control facility that is operative to restrict or prevent the use or inclusion of gaseous fuel in the operative fuel mixture based on any one or more factors that may be predetermined or otherwise "user defined". In at least partial accord therewith a "status display facility", preferably in the form of a bi-LED annunciating device, may be made available to the operator. Such an annunciating device or facility will allow the operator to immediately recognize the operational status as well as the overall status of the fuel distribution system of the present invention including, but not limited to, the status of the alarm, pre-alarm hold, control hold, composition of the operative fuel mixture (existence of gaseous fuel in the composition), etc. Therefore, the electronic control unit incorporated in the fuel control system of the present invention includes structural and operative features which facilitate the determination of the preferred or required composition of the operative fuel mixture being both distillate and gaseous fuel combined or substantially 100% distillate fuel, considering the current operating modes and operating characteristics of the vehicle.

In regard to the operating modes and operating characteristics of the vehicle engine, it is recognized that gaseous fuel is not included in the operative fuel composition when the vehicle is in a low idle, high idle or descent modes of operation. Accordingly the electronic control unit discriminates between the operating modes by referencing operating characteristics such as engine speed, wheel speed, engine map and vehicle pitch. Further, each control value of the aforementioned set points is user programmable and non-latching, i.e., exceeding control set point values results in a temporary modification of vehicle engine operation. Moreover, versatility of the fuel control system of the present invention and the operation of the mine haul vehicle may be significantly enhanced by including remote monitoring capabilities. As such, the various operating modes and or operating characteristics can have their respective parameters remotely varied or adjusted, such as by means of cellular, satellite or other appropriate communication networks.

Another operative feature of the fuel control system of the present invention is the ability to interface with the OEM chassis and engine data network of the mine haul truck. It is recognized that all modern electronic diesel engines incorporate a "controller area network" or Can-bus that allows the OEM controller of the vehicle to interface with all of the various sensors and end-devices used on the engine. Accordingly, by interfacing with the Can-bus network, the system of the present invention can utilize existing sensor data such as, but not limited to, that associated with the wheel speed, MAP, MAT, engine RPM, etc. as well as chassis data, without having to utilize or rely on dedicated sensors.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As schematically represented in the accompanying Figures, the present invention is directed to a control system operative to establish a coordinated mixture or more specifically an operative fuel mixture of combined gaseous fuel and distillate fuel or alternatively only distillate fuel dependent on operating modes and operating characteristics of a vehicle. In particular, the control system of the present invention is specifically adaptable for use with high capacity vehicles, such as, but not limited to locomotives, earth moving equipment such as bulldozers, front-end loaders and shovels, container handling equipment such as rubber tire gantry cranes and reach stackers, heavy duty trucks and buses, and preferably, off-road vehicles such as mine haul trucks.

Figure 1:
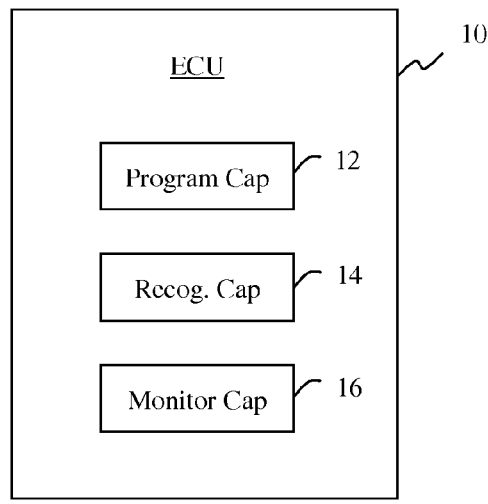
FIG. 1 is a schematic representation in block diagram form of one operative component of the fuel control system of the present invention directed to an electronic control unit and its various capabilities as a participant in the operation of the fuel control system.
Figure 2:
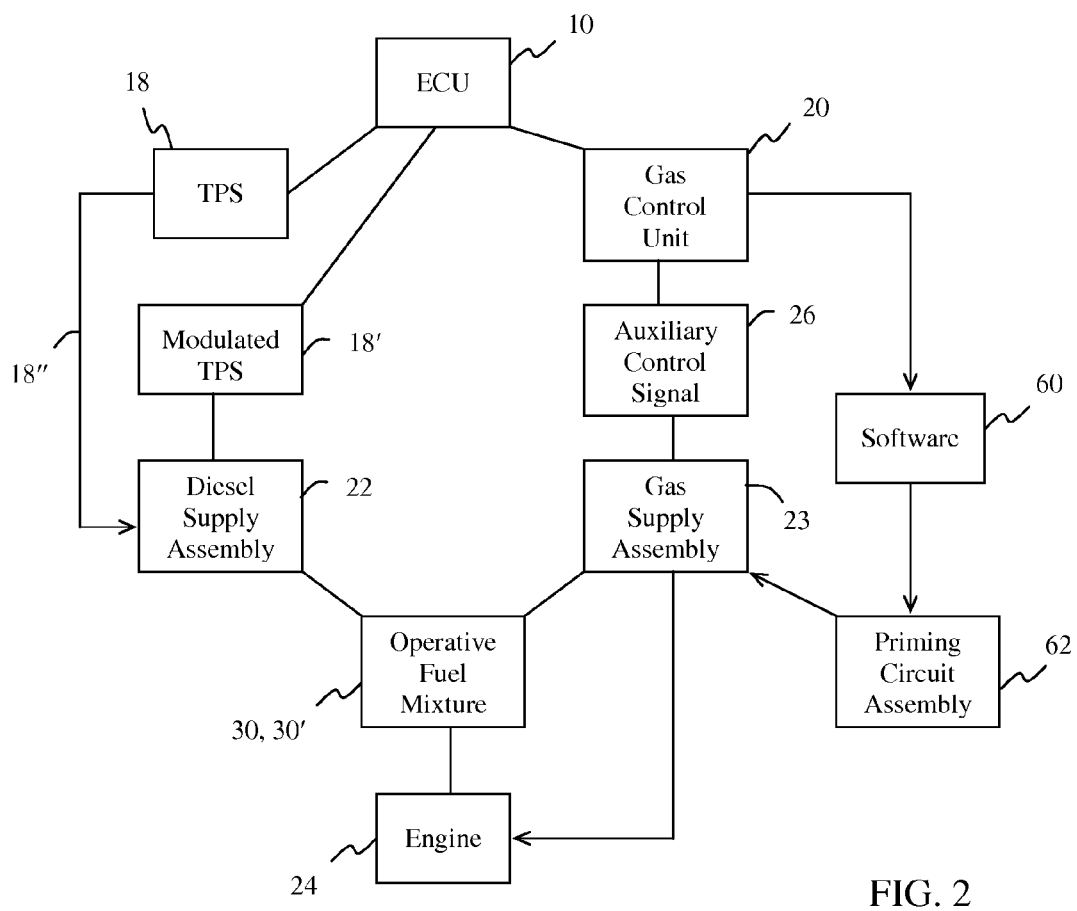
FIG. 2 is a schematic representation in block diagram form of operative steps associated with the electronic control unit.

More specifically, the control system of the present invention comprises an electronic control unit 10 (ECU) which during practice and performance of the control system of the present invention demonstrates the operative features of its programming capabilities 12, recognition capabilities 14 and monitoring capabilities 16 as represented in FIG. 1. As represented in FIG. 2, the ECU 10 receives a throttle position signal 18 based on a "fly by wire" procedure incorporating an electronic interface. Moreover, the throttle position signal 18 is generated by the vehicle throttle assembly (throttle foot pedal) and dependent on the operating modes 34 and the operating characteristics 39 operative conditions of the vehicle and/or vehicle engine 24, may be delivered to the ECU 10 wherein the TPS 18 is modified, as at 18' to establish an operative fuel mixture 30 which is composed of both distillate fuel and gaseous fuel, as explained in greater detail hereinafter. However, when the operating modes 34 of the vehicle and/or engine 24 dictate that the composition of the operative fuel mixture 30' is 100% distillate fuel, the TPS 18 will not be modified or modulated, as at 18", and be transmitted to the diesel fuel supply assembly for delivery to the engine 24 in the form of an operative fuel mixture 30' which is composed of 100% diesel fuel.

It is emphasized the term "modulated" as used herein is meant to describe a modification of the originally generated TPS 18 received from the throttle pedal and is not meant to describe the generation of a "new signal form". More specifically the modulated TPS signal 18' represents a modification of the TPS 18 which informs the diesel supply assembly 22 that a lesser, predetermined percentage of the diesel fuel is to make up a portion of the operative fuel mixture 30. Therefore the modulated TPS 18' signal can be accurately described as a "predetermined percentage" of the original TPS signal 18, which is representative of the "percentage" of the diesel fuel contained in the operative fuel mixture 30. Accordingly, if the operating modes 34, 36 indicate that the operative fuel mixture should comprise both diesel and gaseous fuel mixture, the TPS 18 is "pulled" into the ECU 10 and modified to the extent that the modulated signal 18' represents a percentage of the original TPS signal 18 sufficient to deliver the proper percentage of diesel fuel to the operative fuel mixture 30.

Accordingly, when the operating modes 34 of the vehicle/engine 24 comprise a first predetermined number of operating modes 36 the ECU 10 is operatively structured to modify or modulate the received throttle position signal 18, resulting in the generation of a "modulated throttle position signal" 18' which is delivered to the diesel supply assembly as represented in FIG. 2. As operatively structured, the gas supply assembly 23 and gas control unit 20 determines the amount of gaseous fuel to be included in the operative fuel mixture 30 and the timing of delivery of the gaseous fuel delivered to the engine 24. As indicated herein, the operative fuel mixture 30 is composed of both diesel and gaseous fuel in predetermined quantities as it is delivered to the engine 24.

However, the fuel control system of the present invention also includes a gas control unit 20, which is disposed and structured for the delivery of a gaseous fuel source, such as natural gas. Further interaction between the ECU 10 and the gas control unit 20 will serve to generate an "auxiliary fuel control signal" 26 which is delivered to a gas supply assembly 23. It is of note that the modulated throttle position signal 18' and the auxiliary fuel control signal 26 may be substantially concurrently delivered to the respective diesel supply assemble 22 and the gas supply assembly 23. As a result, the predetermined mixture of both gaseous fuel and distillate fuel results in the formation and delivery of the "operative fuel mixture" 30 to the engine 24 of the vehicle. Therefore, as indicated the modulated throttle position signal 18' and the auxiliary fuel control signal 26 are collectively determinative of a quantity of gaseous fuel to be included in the operative fuel mixture 30 along with the appropriate quantity of distillate fuel. Once the operative fuel mixture 30 is determined, its delivery to the engine results in its current powering and operation, based in part on the operating modes and/or operating characteristics of the vehicle as explained in greater detail hereinafter.

With further reference to FIG. 2, it is recognized when the above noted composition of the operative fuel mixture 30 is utilized, the gaseous fuel does not "arrive" instantly. Therefore, a priming circuit assembly 62 is operatively associated with the gas control unit 20 and/or the gas supply assembly 23, as well as regulating software 60. Moreover, when the TPS 18 is being modified and the flow of diesel to the engine is stopped, the priming circuit assembly 62 is operative to direct a dedicated quantity of gaseous fuel to the engine independent of the gas supply assembly 23 being driven by the auxiliary control signal 26. The delivery of this dedicated quantity of gaseous fuel will therefore compensate for the lag in fuel delivery to the engine 24.

Figure 3:
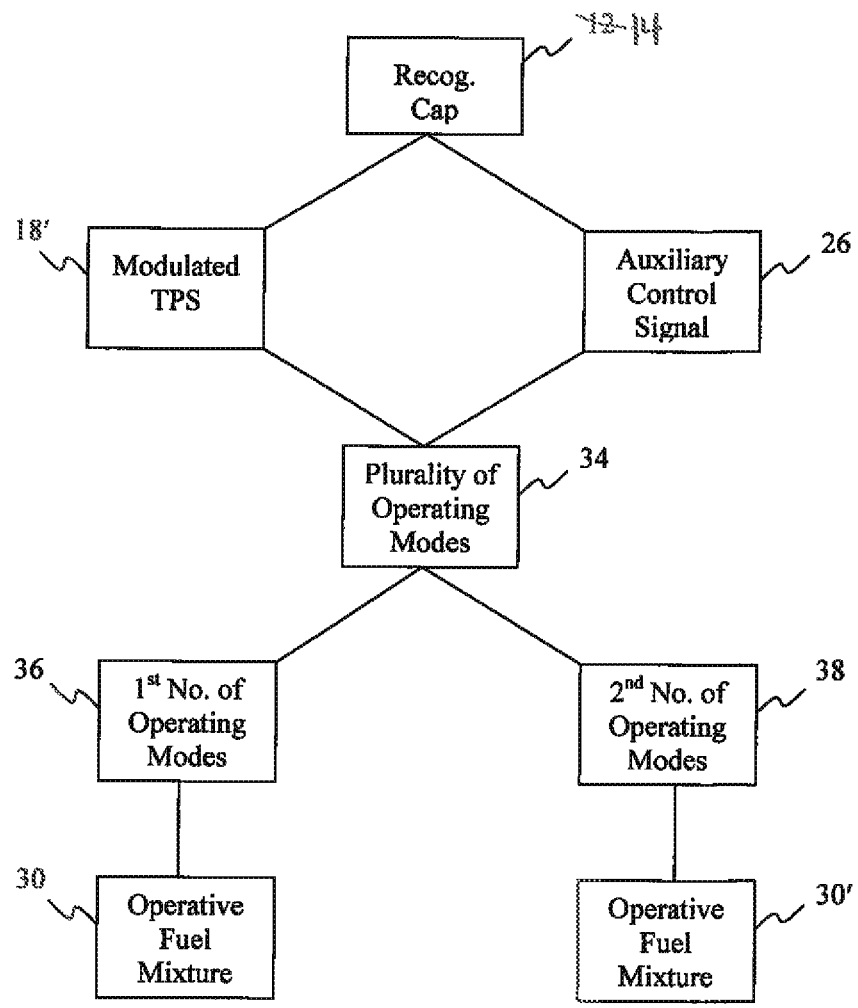
FIG. 3 is a schematic representation in block diagram form of the operation and performance of recognition capabilities of the electronic control unit during the performance of the fuel control system of the present invention.

As represented in FIG. 3 and as set forth above, the ECU 10 includes recognition capabilities 14. The recognition capabilities 14 are operative to regulate or restrict both the modulation of the throttle control signal or more specifically the modulated throttle control signal 18' as well as the auxiliary control signal 26 dependent, at least in part, on a plurality of operating modes 34 of the vehicle. As relates to the high capacity, off road vehicle specifically including a mine haul truck, the plurality of operating modes include: low idle, vehicle at rest; high idle (dump mode), vehicle at rest; unloaded zero grade orientation; loaded zero grade orientation; unloaded climb orientation; loaded climb orientation; unloaded dissent orientation and loaded dissent orientation. However, it is further recognized that out of the above noted possible operating modes set forth above, a lesser "first predetermined number" of operating modes 36 is adaptive for the use of an operative fuel mixture 30 which comprises both gaseous fuel and distillate fuel.

Accordingly, the first predetermined number of operating modes 36 comprise: the vehicle being unloaded on a zero grade; loaded on a zero grade; unloaded in a climb orientation and loaded in a climb orientation. As a result the remainder of the above outlined plurality of the operating modes 34 are defined by a "second predetermined number" of operating modes 38, which include: the vehicle being at low idle, vehicle at rest; high idle (dump mode), vehicle at rest; unloaded in a dissent orientation and loaded in a dissent orientation. Therefore, when the recognition capabilities 12 of the ECU 10 are operative to recognize the vehicle assuming any of the second plurality of operating modes 38, the result is a restriction or regulation of the modulation of the throttle position signal 18' as well as the restriction or elimination of the generation of the auxiliary controls signal 26. In turn, the operative fuel mixture 30' will be void of any gaseous fuel component as the vehicle operates in any one of the second predetermined number of operating modes 38.

Figure 4:
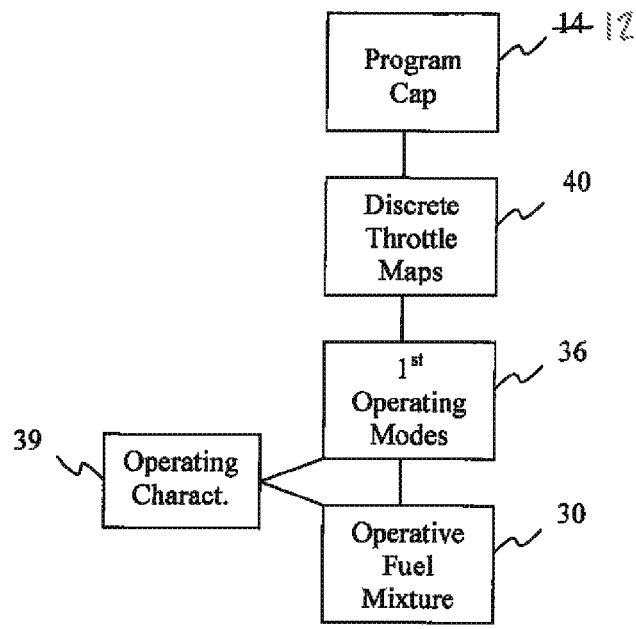
FIG. 4 is a schematic representation in block diagram form of the programming capabilities associated with the electronic control unit.

With primary reference to FIG. 4, the electronic control unit 10 further comprises the aforementioned programming capabilities 12 structured to establish a predetermined fuel composition of the operative fuel mixture 30, for vehicle operation during the first predetermined number of operating modes 36. More specifically, the programming capability 12 is operative allow a pre-selection of discrete throttle maps 40 for at least some or all of the first operating modes 36. Each of the discrete throttle maps 40 are defined by the operative fuel mixture 30 being composed of both gaseous fuel as well as distillate fuel, as the operative fuel mixture is delivered to the vehicle engine 24. Moreover, each of the discrete throttle maps 40 is preselected for maximizing efficiency of the vehicle engine 24 during a different one of the first predetermined number of operating modes 36. As such, each of the discrete throttle maps 40 is at least partially depended on prescribed combustion parameters of the vehicle engine.

Further with regard to FIG. 4, the ECU 10, including the recognition capabilities 14 associated therewith, is operative with the programming capabilities 12 to recognize "operating characteristics" 39 of the vehicle during the occurrence of at least some of the operating modes 36. For purposes of clarity and specifically relating to a high capacity off road vehicles specifically including mine haul trucks, the operating characteristics 39 comprise: the vehicle engine RPM; wheel speed; distillate throttle position signal; gaseous auxiliary control system and vehicle pitch and payload.

Figure 5:
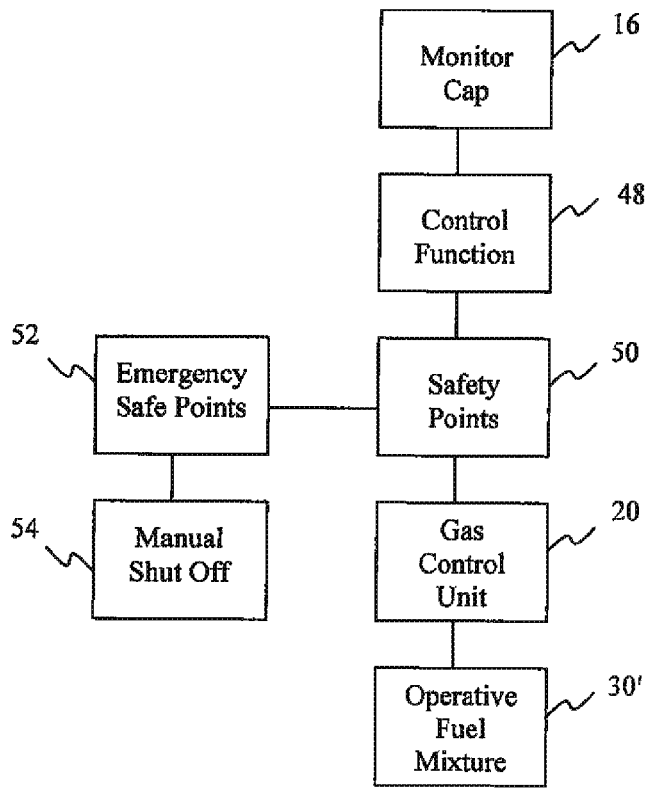
FIG. 5 is a schematic representation in block diagram form of operative features of the monitoring capabilities of the electronic control unit of the fuel control system of the present invention.

FIG. 5 is directed to the monitoring capabilities 16 which may be interactive with the fuel control system of the present invention such as by being integrated as part of the ECU 10, as indicated in FIG. 1, or as otherwise interactive therewith. The monitoring capabilities 16 are structured to monitor a plurality of predetermined vehicle safety set points 50 indicative of safe operation of the vehicle. Monitoring capabilities 16 include a control function 48 interactive with the gaseous control unit 20 to restrict or eliminate the contribution of gaseous fuel to the operative fuel mixture 30'. This will occur upon the monitoring capabilities 16 indicating or determining that the predetermined vehicle safety points 50 have been exceeded. During such an occurrence the operative fuel mixture 30' is void of any gaseous fuel. Accordingly, the control function 48 is interactively operative with the monitoring capabilities 16 and is structured to negate both modulation of the throttle position signal 18' and the generation of the auxiliary control signal 26 upon the occurrence of the predetermined safety set points 50 being exceeded. In addition to the general predetermined and/or preprogrammed safety features 50, at least a plurality of such safety features may be preprogrammed and set as emergency safety set points as at 52. As a result, the operator in the cab of the vehicle is provided access to a gaseous fuel supply shut off 54. The shut-off may be manually operated by occupants of the cab of the vehicle and responsive to determination by the monitoring capabilities of at least one of the emergency safety set points 52 of the vehicle. As set forth above, the manual shut-off is operative to override normally controlling capabilities and functionalities of the ECU 10.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A control system operative to establish a coordinated mixture of gaseous and distillate fuels for a high-capacity off-road vehicle, said control system comprising:

an electronic control unit including programming capabilities and recognition capabilities; said programming capabilities operative to recognize a first predetermined number of operating modes and a second predetermined number of operating modes of the vehicle, said recognition capabilities cooperative with said programming capabilities and being operative to recognize operating characteristics of the vehicle, said electronic control unit structured to receive an original throttle position signal from a vehicle throttle assembly and generate a modulated throttle position signal to a vehicle engine control assembly, dependent on said first predetermined number of operating modes, a gaseous control unit structured to generate an auxiliary fuel control signal to said gaseous control unit dependent on said second predetermined number of operating modes, said modulated throttle position signal and said auxiliary control signal determinative of quantities of distillate fuel and gaseous fuel to be included in an operative fuel mixture on which the vehicle engine operates during said first and second predetermined number of operating modes respectively, said operative fuel mixture comprising both said gaseous fuel and said distillate fuel when the vehicle is operating in said first predetermined number of operating modes, said operative fuel mixture comprising said distillate fuel and substantially void of said gaseous fuel when the vehicle is operating in said second predetermined number of operating modes, and said programming capabilities further operative to perform a throttle mapping function comprising the ability to preselect discrete throttle maps for at least some of said first operating modes.

2. A control system as recited in claim 1 wherein said modulated throttle position signal and said auxiliary control signal are substantially concurrently generated during said first predetermined number of operating modes to establish said operative fuel mixture appropriate to a current operating mode.

3. A control system as recited in claim 2 wherein said electronic control unit includes recognition capabilities operative to restrict both modulation of said throttle position signal and generation of said auxiliary control signal dependent on recognition of at least a second predetermined number of operating modes of the vehicle.

4. A control system as recited in claim 1 wherein said first predetermined number of operating modes comprise the vehicle being: in motion while unloaded on a zero grade support surface; in motion while loaded on a zero grade support surface; in motion while unloaded in a climbing orientation; in motion while loaded in a climbing orientation.

5. A control system as recited in claim 4 wherein each of said discrete throttle maps is preselected for maximizing efficiency of the vehicle engine operation during different ones of said first predetermined number of operating modes.

6. A control system as recited in claim 1 wherein said electronic control unit includes recognition capabilities operative to regulate both modulation of said throttle position signal and generation of said auxiliary control signal dependent on recognition of at least a second predetermined number of operating modes of the vehicle, wherein said operative fuel mixture comprises distillate fuel substantially void of gaseous fuel during said second predetermined number of operating modes.

7. A control system as recited in claim 1 wherein said electronic control unit further comprises recognition capabilities operative with said programming capabilities and structured to recognize operating characteristics of the vehicle during at least some of said operating modes.

8. A control system as recited in claim 7 wherein said second predetermined number of operating characteristics comprise one or more of the vehicle engine RPM; engine manifold air pressure; vehicle wheel speed; distillate throttle position signal; gaseous auxiliary control signal; vehicle pitch condition and vehicle payload.

9. A control system as recited in claim 1 wherein said electronic control unit further comprises recognition capabilities structured to determined engine speed; said electronic control unit including a limiting function operative with at least said gaseous control unit to regulate the quantity of gaseous fuel in said operative fuel mixture.

10. A control system as recited in claim 9 wherein said limiting function of said electronic control unit are operative to decrease the quantity of gaseous fuel in said operative fuel mixture concurrent to engine speed exceeding predetermined engine speed parameters.

11. A control system as recited in claim 1 further comprising monitoring capabilities structured to monitor a plurality of predetermined vehicle and engine safety set points indicative of safe operation of the vehicle; said monitoring capabilities including a control function interactive with said gaseous control unit to restrict gaseous fuel in said operative fuel mixture upon said monitoring capabilities indicating that said predetermined vehicle safety set points have been exceeded.

12. A control system as recited in claim 11 wherein said control function is cooperatively structured with said gaseous control unit to substantially eliminate gaseous fuel content from said operative fuel mixture.

13. A control system as recited in claim 12 wherein said control function is operative to negate both modulation of said throttle position signal and generation of said auxiliary control signal dependent on recognition of at least some of said operating modes of the vehicle.

14. A control system as recited in claim 13 wherein said control function is operative to negate both modulation of said throttle position signal and generation of said auxiliary control signal dependent on recognition of at least said second predetermined number of operating modes of the vehicle.

15. A control system as recited in claim 11 further comprising a gaseous fuel supply shut-off manually operative and responsive to determination by said monitoring capabilities of at least one of said plurality of predetermined vehicle safety set points.

16. A control system as recited in claim 11 wherein said plurality of predetermined vehicle safety set points comprise gaseous fuel level; engine RPM; wheel speed; engine vibration; engine exhaust gas temperature; combustible gas detection (LEL); engine manifold air pressure; vehicle pitch condition and vehicle roll condition.

17. A control system operative to establish a coordinated mixture of gaseous and distillate fuel for operation of a high capacity off-road vehicle, said control system comprising:
  an electronic control unit including programming capabilities and recognition capabilities; said programming capabilities operative to recognize a first predetermined number of operating modes and a second predetermined number of operating modes of the vehicle,
  said recognition capabilities cooperative with said programming capabilities and being operative to recognize operating characteristics of the vehicle,
  said electronic control unit structured to modulate a throttle position signal from the vehicle throttle assembly and generate a modulated throttle position signal directly to a vehicle engine control assembly dependent on said first predetermined number of operating modes;
  a gaseous control unit; said electronic control unit further structured to generate an auxiliary fuel control signal to said gaseous control unit dependent on said second predetermined number of operating modes of the vehicle,
  said auxiliary control signal determinative of a quantity of gaseous fuel to be included in an operative fuel mixture,
  said modulated throttle position signal and said auxiliary control signal being determinative of said operative fuel mixture on which the vehicle engine operates during said first predetermined number and said second predetermined number of said operating modes respectively,
  said programming capabilities operative to pre-select one of a plurality of discrete throttle maps, each of said plurality of discrete throttle maps corresponding to at least one of said first predetermined number of operating modes; each of said discrete throttle maps defined by said operative fuel mixture comprising a predetermined gaseous and distillate fuel mixture for vehicle engine operation within normal combustion parameters of the vehicle with respect to at least one of said first predetermined number of operating modes,
  said operative fuel mixture further comprising a maximum amount of gaseous fuel possible within said normal combustion parameters,
  said operative fuel mixture comprising both said gaseous fuel and said distillate fuel when the vehicle is operating in said first predetermined number of operating modes, and said operative fuel mixture comprising said distillate fuel and substantially void of said gaseous fuel when the vehicle is operating in said second predetermined number of operating modes.

18. A control system as recited in claim 17 wherein said first predetermined number of operating modes comprise the vehicle being at rest in a low idle condition; at rest in a high idle condition; in motion while unloaded on a zero grade support surface; in motion while loaded on a zero grade support surface; said second predetermined number of operating modes comprise the vehicle being in motion while unloaded in a climbing orientation; in motion while loaded in a climbing orientation; in motion while unloaded in a descent orientation; and in motion while loaded in a descent orientation.

19. A control system as recited in claim 18 wherein said operating characteristics comprise: the vehicle engine RPM; vehicle speed; distillate throttle position signal; gaseous auxiliary control signal; vehicle pitch condition and vehicle payload condition.

\* \* \* \* \*